United States Patent
Kim et al.

(10) Patent No.: US 10,027,643 B2
(45) Date of Patent: Jul. 17, 2018

(54) AUTHENTICATING HOME DEVICE USING DEVICE TOKEN ISSUED BASED ON IDENTIFIER OF TERMINAL

(71) Applicant: Samsung Electronics Co., Ltd., Suwon-si, Gyeonggi-do (KR)

(72) Inventors: Jun-Hyung Kim, Yongin-si (KR); Dong-Keon Kong, Suwon-si (KR); Se-Hoon Kim, Seoul (KR); Jai-Ick Chun, Seoul (KR); Eun-Hui Bae, Seoul (KR); Se-Il Kim, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 97 days.

(21) Appl. No.: 14/494,019

(22) Filed: Sep. 23, 2014

(65) Prior Publication Data
US 2015/0089624 A1  Mar. 26, 2015

Related U.S. Application Data

(60) Provisional application No. 61/881,114, filed on Sep. 23, 2013.

(30) Foreign Application Priority Data

Sep. 23, 2014 (KR) .......................... 10-2014-0126571

(51) Int. Cl.
*H04L 29/06* (2006.01)
*G06F 21/44* (2013.01)
(Continued)

(52) U.S. Cl.
CPC ............ *H04L 63/08* (2013.01); *G06F 21/335* (2013.01); *G06F 21/44* (2013.01); *H04L 9/0866* (2013.01);
(Continued)

(58) Field of Classification Search
CPC ................................. H04L 63/08; G06F 21/44
(Continued)

(56) References Cited

U.S. PATENT DOCUMENTS

| | | | |
|---|---|---|---|
| 2006/0174105 A1* | 8/2006 | Park | G06F 21/34 |
| | | | 713/155 |
| 2007/0086049 A1 | 4/2007 | Lee et al. | |

(Continued)

FOREIGN PATENT DOCUMENTS

| | | |
|---|---|---|
| CN | 1953410 A | 4/2007 |
| CN | 102150412 A | 8/2011 |

(Continued)

*Primary Examiner* — Haresh N Patel
(74) *Attorney, Agent, or Firm* — Jefferson IP Law, LLP

(57) ABSTRACT

To solve the problems that may occur due to the leakage of user account information, the present disclosure may manage the security using the device token that is used independently of that of the server, that is generated by a home device, and that can be used for device authentication when a smart phone controls home appliances. With the use of the device token, the present disclosure may solve the problems that the status information of home appliances is exposed by another person or the home appliances are controlled by another person, even though the user account information is leaked.

24 Claims, 16 Drawing Sheets

(51) Int. Cl.
*H04W 12/06* (2009.01)
*G06F 21/33* (2013.01)
*H04L 12/28* (2006.01)
*H04L 29/08* (2006.01)
*H04L 9/08* (2006.01)
*H04L 9/32* (2006.01)
*H04L 12/12* (2006.01)
*H04W 4/70* (2018.01)
*H04W 4/06* (2009.01)
*H04W 4/08* (2009.01)

(52) U.S. Cl.
CPC ............ *H04L 9/3226* (2013.01); *H04L 12/12* (2013.01); *H04L 12/282* (2013.01); *H04L 12/2816* (2013.01); *H04L 63/0807* (2013.01); *H04L 67/125* (2013.01); *H04W 4/70* (2018.02); *H04W 12/06* (2013.01); *G06F 2221/2137* (2013.01); *H04W 4/06* (2013.01); *H04W 4/08* (2013.01)

(58) Field of Classification Search
USPC .......................................................... 726/9
See application file for complete search history.

(56) References Cited

U.S. PATENT DOCUMENTS

| | | | |
|---|---|---|---|
| 2008/0026725 A1 | 1/2008 | Cha | |
| 2008/0133715 A1* | 6/2008 | Yoneda | H04L 12/2821 709/219 |
| 2008/0229406 A1 | 9/2008 | Go | |
| 2009/0121842 A1* | 5/2009 | Elberbaum | G08C 17/02 340/10.5 |
| 2010/0008254 A1 | 1/2010 | Schneyer et al. | |
| 2010/0009681 A1 | 1/2010 | Schneyer et al. | |
| 2010/0049965 A1 | 2/2010 | Han et al. | |
| 2011/0314515 A1* | 12/2011 | Hernoud | H04W 12/06 726/2 |
| 2013/0019295 A1* | 1/2013 | Park | H04L 9/3213 726/7 |
| 2013/0173811 A1 | 7/2013 | Ha et al. | |
| 2013/0232557 A1* | 9/2013 | Shimono | G06F 21/41 726/4 |
| 2014/0020081 A1* | 1/2014 | Zhang | H04L 63/083 726/9 |
| 2014/0075513 A1* | 3/2014 | Trammel | H04L 9/3213 726/4 |
| 2014/0215587 A1* | 7/2014 | Burch | H04L 63/08 726/6 |
| 2015/0074782 A1* | 3/2015 | Zhang | H04W 12/06 726/8 |

FOREIGN PATENT DOCUMENTS

| | | |
|---|---|---|
| JP | 2006-295728 A | 10/2006 |
| KR | 10-2007-0042771 A | 4/2007 |
| KR | 10-2008-0011581 A | 2/2008 |
| KR | 10-2010-0022927 A | 3/2010 |
| WO | 2005/088896 A1 | 9/2005 |
| WO | 2006/083141 A1 | 8/2006 |
| WO | 2012/060021 A1 | 5/2012 |

* cited by examiner

| Request | The Controller device pushes AP access information including SSID of Home AP |
|---|---|
| PUT /devices/0/configuration/networks/0/wifi HTTP/1.1<br>Host: {IPv4Address}<br>X-API-Version: v1.5.0<br>Content-Type: application/json<br>Content-Length: {contentLength}<br>{<br>    "WiFi": {<br>        "ssid": "OFFICEAP02",<br>        "securityType": "WPA2-PSK",<br>        "encryptionType": "TKIP",<br>        "securityKey": "12345678"<br>    }<br>} | |
| Request | |
| HTTP/1.1 204 No Content | |

FIG.2

| Request | Retrieve device info. of the Controller device |
|---|---|
| GET /devices/0 HTTP/1.1<br>Host: {IPv4Address}<br>X-API-Version: v1.5.0<br>Content-Type: application/json | |
| Response | |
| HTTP/1.1 200 OK<br>X-API-Version: v1.5.0<br>Content-Type: application/json<br>Content-Length: {contentLength}<br>{<br>    "Device": {<br>        "id": "0",<br>        "name": "Jhon's mobile",<br>        "type": "SmartPhone",<br>        "uuid": "530e2400-a19b-0000-0000-000000000000",<br>        "resources": [<br>            "Informaton"<br>        ],<br>        "InformationLink": {<br>            "href": "/devices/0/information"<br>        },<br>    }<br>} | |

FIG.3

| Request | Hand over the configuration value for SCS server access to the device |
|---|---|
| PUT /devices/0/configuration/networks/0/wifi HTTP/1.1<br>Host: {IPv4Address}<br>X-API-Version: v1.5.0<br>Content-Type: application/json<br>Content-Length: {contentLength}<br>{<br>    "Remote": {<br>        "peerID": "3600",<br>        "peerGroupID": "2013-08-01T00:00:00",<br>        "countryCode": "-3600"<br>    }<br>} | |
| Request | |
| HTTP/1.1 204 No Content | |

| Request | Request Device Token from the Controlled device |
|---|---|
| GET /devicetoken/?UUID=54919CA5-4101-4AE4-595B-353C51AA983C HTTP/1.1<br>Host: {IPv4Address}<br>X-API-Version: v1.5.0<br>Content-Type: application/json | |
| Response | |
| HTTP/1.1 200 OK<br>X-API-Version: v1.5.0<br>Content-Type: application/json<br>Content-Length: {contentLength}<br>{<br>    "DeviceToken": "djflaiger9"<br>} | |

| Request | Pause the Aircon |
|---|---|
| PUT /devices/0/operation HTTP/1.1<br>Host: {IPv4Address}<br>X-API-Version: v1.5.0<br>Authorization: Bearer djflaiger9<br>Content-Type: application/json<br>Content-Length: {contentLength}<br>{<br>    "Operation": {<br>        "state": "Pause"<br>    }<br>} ||
| Request | |
| HTTP/1.1 204 No Content ||

FIG.9

| Response |
|---|
| HTTP/1.1 401 Unauthorized<br>X-API-Version: v1.5.0<br>WWW-Authenticate: Bearer error="invalid_token"<br>Content-Type: application/json<br>Content-Length: x<br>{<br>    "errorCode": "01XE",<br>    "errorDescription": "Token is not valid"<br>} |

FIG.10

AUTHENTICATING HOME DEVICE USING DEVICE TOKEN ISSUED BASED ON IDENTIFIER OF TERMINAL

CROSS-REFERENCE TO RELATED APPLICATION(S)

This patent application claims priority under 35 U.S.C. § 119(e) to a Provisional patent application filed in the United States Patent and Trademark Office on Sep. 23, 2013 and assigned Ser. No. 61/881,114, and under 35 U.S.C. § 119(a) to a Korean patent application filed in the Korean Intellectual Property Office on Sep. 23, 2014 and assigned Serial No. 10-2014-0126571, the entire disclosure of which is hereby incorporated by reference.

BACKGROUND

Field

The present disclosure relates to a method and apparatus for managing the security in a home network system.

Description of Related Art

The home network system refers to a system that enables control of home devices by connecting home devices installed in the home over the wired or wireless network. An advanced home network system may provide a variety of services associated with the Internet by integrating home devices through a Home Gateway (HGW) and connecting them to the external public data network, for example, Internet Protocol (IP) network (i.e., the Internet). The home network system may provide the user desired services by controlling the home devices at the request of the user.

Conventionally, in the home network system, if user account information such as IDs and passwords is leaked, information about the home devices that are registered with the account of another person may be undesirably circulated from a service server using the user account information of another person. Based on the circulated information, home devices of another person may be controlled undesirably.

SUMMARY

An aspect of embodiments of the present disclosure is to provide a security management method and apparatus for protecting user account information in a home network system.

In accordance with an aspect of an embodiment of the present disclosure, there is provided a security management method in a controller device that controls a home device in a home network system. The method includes transmitting a request for a device token to the home device; receiving a device token issued from the home device; and if the controller device controls the home device, authenticating the home device using the device token. The device token may be issued based on an identifier of the controller device.

In accordance with another aspect of an embodiment of the present disclosure, there is provided a security management apparatus in a controller device that controls a home device in a home network system. The apparatus includes a transmitting unit configured to transmit a request for a device token to the home device; a receiving unit configured to receive a device token issued from the home device; and a controller configured to authenticate the home device using the device token, if the controller device controls the home device. The device token may be issued based on an identifier of the controller device.

In accordance with further another aspect of an embodiment of the present disclosure, there is provided a security management method in a home device that is controlled by a controller device in a home network system. The method includes receiving a device token request message from the controller device; and issuing a device token based on an identifier of the controller device.

In accordance with yet another aspect of an embodiment of the present disclosure, there is provided a security management apparatus in a home device that is controlled by a controller device in a home network system. The apparatus includes a receiving unit configured to receive a device token request message from the controller device; and a controller configured to issue a device token based on an identifier of the controller device.

BRIEF DESCRIPTION OF THE DRAWINGS

FIGS. 2 and 3 illustrate examples of an AP access information request message and an AP access information response message for transmission of home AP access information in operations 115 and 119 in FIG. 1B;

FIGS. 9 and 10 illustrate examples of a control command message and a control response message in FIG. 8 according to an embodiment of the present disclosure;

DETAILED DESCRIPTION

Figure 1A:
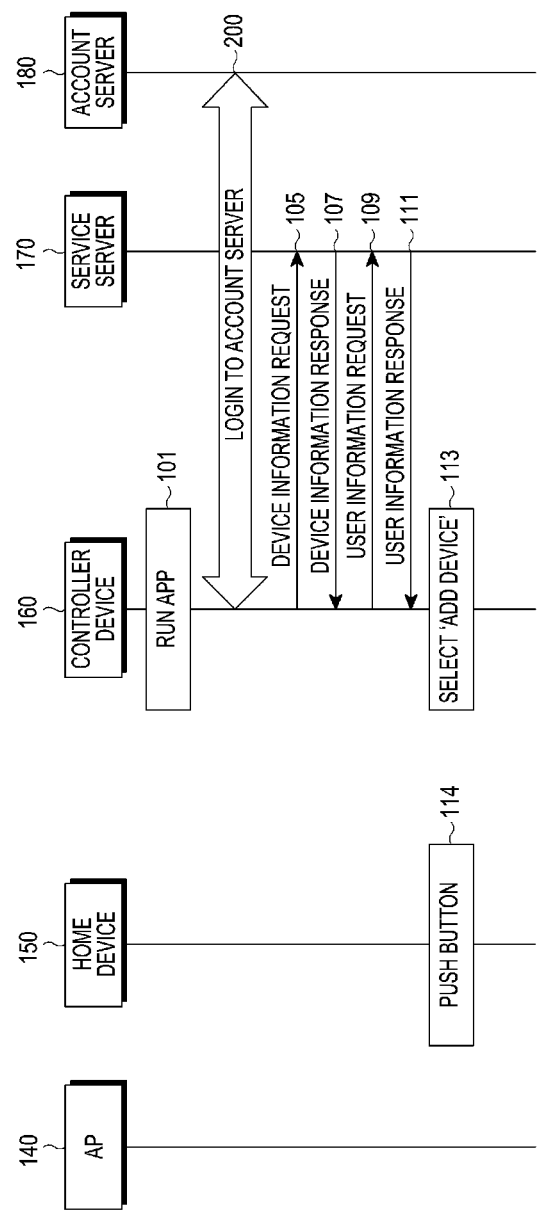
FIGS. 1A and 1B illustrate an example of a procedure for connecting a home device to a home network in a home network system according to an embodiment of the present disclosure.

Hereinafter, a detailed description of preferred embodiments of the present disclosure will be made with reference to the accompanying drawings. It should be noted that in the accompanying drawings, the same components are denoted by the same reference numerals. A detailed description of known functions and configurations will be omitted when it may obscure the subject matter of the present disclosure.

The terms or words as used in the specification and claims should not be construed as ordinary or dictionary meaning in a limited manner, but should be interpreted as the meanings and concepts corresponding to the technical aspects of the present disclosure based on the principle that the inventor(s) can define appropriate terms and concepts to describe his/her invention in the best way.

Figure 1B:
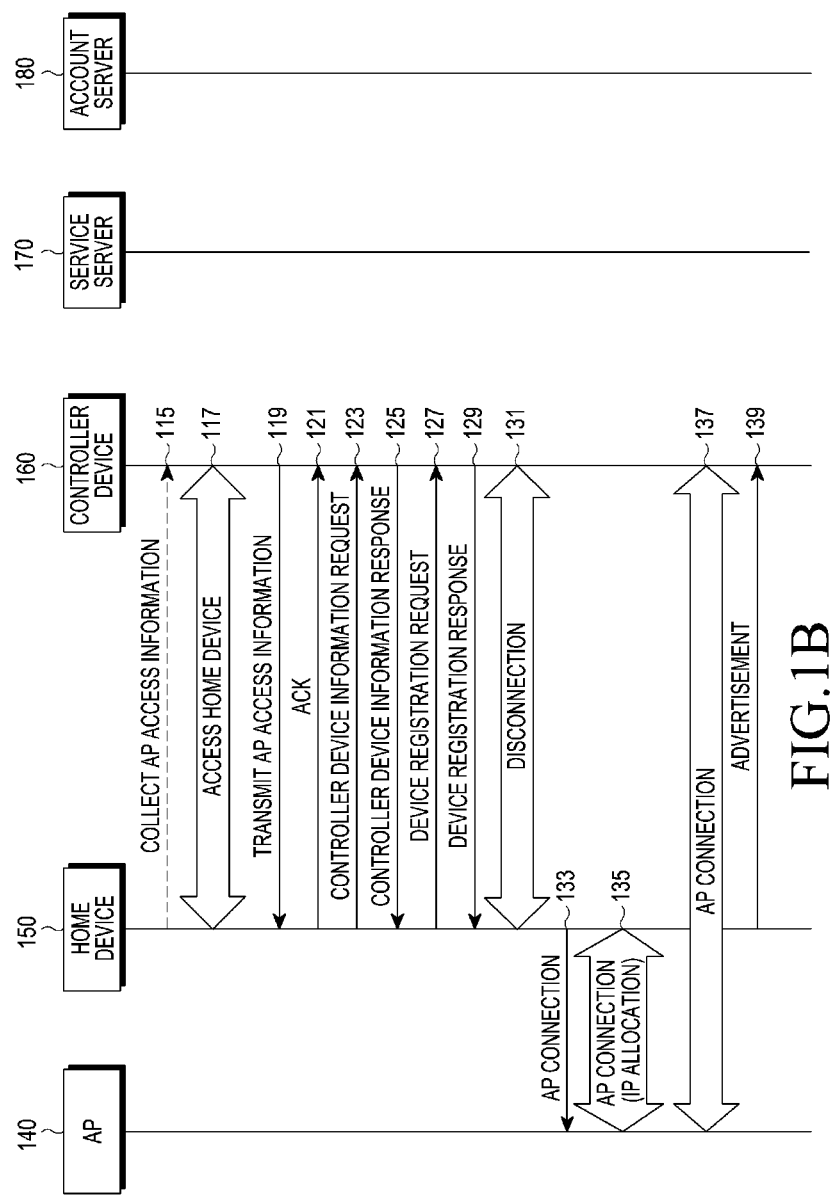

FIGS. 1A and 1B illustrate an example of a procedure for connecting a home device to a home network in a home network system according to an embodiment of the present disclosure.

In particular, FIGS. 1A and 1B illustrate a procedure for connecting a home device to a home network in a home network system for supporting a soft AP mode. The soft AP mode means a mode in which a controlled device (i.e., a home device to be described below) operates as an AP.

Before a description of FIGS. 1A and 1B, it will be assumed that the home devices installed inside the home (or outside the home) have already connected to the home network system. In other words, a newly purchased home device 150 may perform a pre-procedure of connecting with the home network system (e.g., a controller device 160) when it is first installed inside the home (or outside the home), and at this time, the controller device 160 may obtain and store device information about the newly purchased home device 150 and user information about a peer ID, a peer group ID 'peerGroup ID' and a country code 'countryCode'. The device information about the home device may include, for example, a unique user identifier (UUID) which is a unique ID of the home device and, in addition, include 'type', 'name', 'description', 'manufacturer', 'model ID', 'serialNumber', 'salesLocation', 'versions' and the like. The peerGroup ID indicates a group of home devices that are registered in a service server 170 using a specific user account, and the countryCode indicates information about the country where a user of the controller device 160 is located.

Referring to FIGS. 1A and 1B, the illustrated home network system may include an access point (AP) 140, the home device 150, the controller device 160, the service server 170 and an account server 180.

The controller device 160 is a device that the user uses for the purpose of checking the status of the home device 150 or controlling the home device 150, and the controller device 160 may be, for example, a mobile terminal such as a smart phone, or a tablet PC.

The home device 150 is a device that is located inside the home (or outside the home) and can be controlled by the controller device 160, and the home device 150 may include smart appliances, security devices, lighting devices, energy devices and the like. For example, the smart appliances may be TVs, air conditioners, refrigerators, washers, robot cleaners, humidifiers and the like; the security devices may be doorlocks, security cameras, Closed Circuit Televisions (CCTVs), security sensors and the like; the lighting devices may be Light Emitting Diodes (LEDs), lamps and the like; and the energy devices may be heating equipment, power meters, power sockets, electric outlets, multitaps and the like. In addition, the home device 150 may include Personal Computers (PCs), IP cameras, Internet phones, wired/wireless phones, electrically controllable curtains or blinds, and the like.

The account server 180 is a server that manages the account for the user of the controller device 103, and if the user logs in to the account server 180, the account server 180 may allow the user to be connected to the service server 170 using single user login information.

The service server 170 is a server that is operated only for the services of the home network system, and may store and manage home device's device information for circulation of information about the home device 150 and, in addition, store and manage all the information for control of the home device 150.

The user may access the service server 170 using an application (e.g., a smart home App) that is run in the controller device 160, to register home device information or to circulate or delete the information about the registered home devices, and/or to register control information for batch control of the home devices or to circulate or delete the registered control information. Although a procedure for registering one home device 150 in the server is described in FIGS. 1A and 1B by way of example, the procedure described in FIGS. 1A and 1B may be applied in the same way even to a procedure of registering, in the server, each of all home devices that can be installed inside the home (or outside the home).

The home device 150 and the controller device 160 to be described below may be singular or plural in number.

In response to a user input, the controller device 160 may run a smart home App in operation 101, and as the smart home App runs, the controller device 160 may automatically log in to the account server 180 in operation 103. Although it will be assumed herein that the controller device 160 automatically logs in to the account server 180 using the previously stored user Identifier (ID) and password, the controller device 160 may log in to the account server 180 by optionally receiving the user ID and password from the user. Since login information is kept for a predetermined period of time unless a logout is made at the request of the user, the controller device 160 doesn't need to log in to the account server 180 every time within the effective period in which the login information is kept. In other words, within the effective period, the user may use or enjoy his/her desired services even without performing an additional login procedure.

In operation 105, the controller device 160 may automatically transmit a device information request message to the service server 170 to request device information registered in the service server 170. In operation 107, the controller device 160 may receive a device information response message including device information registered in the service server 170, from the service server 170.

If the controller device 160 transmits a user information request message to the service server 170 in operation 109, the controller device 160 may receive a user information response message including user information from the service server 170 in operation 111. The user information may include a user identifier, a name, country information and the like.

In operation 113, the controller device 160 may perform an 'Add Device' operation, allowing the user to register a new home device 150 in the service server 170. If the user selects or runs 'Add Device', the controller device 160 may display an 'Add Device' guide on the smart home App. In operation 114, the user may push a specific button on (or a remote controller for) the home device 150 that the user desires to newly add, in accordance with the 'Add Device' guide. If the specific button on the home device 150 is pushed, a soft AP function equipped in the home device 150 may be executed.

In operation 115, the controller device 160 may collect information (e.g., a service set identifier (SSID), a password, a PIN code, soft AP operating channel and the like) used for connecting with the home device 150 that is operating as a soft AP. As for the above information, the user may directly input the information, or the controller device 160 may get the information by near field communication (NFC) tagging, Quick Response (QR) code reading, or pre-storing.

In operation 117, the controller device 160 may access the home device 150 that is operating as a soft AP. In operation 119, the controller device 160 may transmit, to the home device 150, home AP connection information based on which the home device 150 can connect with the home AP. The AP connection information may include an SSID, a security type 'securityType', an encryption type 'encryptionType', a security key 'securityKey' of the home AP. The above information may be transmitted over a secure channel that is based on Transport Layer Security (TLS) between two devices.

FIGS. 2 and 3 illustrate examples of an AP access information request message and an AP access information response message for transmission of home AP access information in operations 115 and 119 in FIG. 1B. In FIG. 2, 'controller' means the controller device 160. Referring to FIG. 2, the AP access information may include an SSID, a security type 'securityType', an encryption type 'encryptionType', a security key 'securityKey' and the like.

In operation 121, the controller device 160 may receive an ACK message from the home device 150.

Thereafter, in operation 123, the controller device 160 may receive a controller device information request message from the home device 150 to obtain a UUID which is a device ID of the controller device 160. Upon receiving the controller device information request message, the controller device 160 may generate a UUID. The UUID may be stored in the home device 150 to be used later for authentication of the controller device 160. FIG. 3 illustrates an example of a controller device information request message (corresponding to Request in FIG. 3) and a controller device information response message for acquisition of information such as a UUID of the controller device 160.

The controller device information response message (corresponding to Response in FIG. 3) may include device information of the controller device 160. The device information may include an id, a name, a type, a UUID, resources, an information link and the like.

In operation 125, the controller device 160 may transmit a controller device information response message including device information of the controller device 160 to the home device 150.

In operation 127, the controller device 160 may receive a device registration request message including detailed information and status information (e.g., home device information) of the home device 150, from the home device 150. In operation 129, the controller device 160 may transmit a device registration response message to the home device 150. The home device information that the controller device 160 has received may be temporarily stored in the controller device 160 until the device information is registered in the service server 170, and may be deleted from the controller device 160 after registered in the service server 170. The home device information that the controller device 160 has received may be used for device registration.

After completion of operation 129, the connection between the home device 150 and the controller device 160 may be released. In operation 133, the home device 150 may attempt AP connection to the home AP 140 using the home AP connection information received from the controller device 160. In operation 135, the home device 150 may be allocated, from the home AP, an IP address that the home device 150 will use in the home network. If the connection between the controller device 160 and the home AP is lost during the procedure, the controller device 160 may re-access the home AP.

If the home device 150 is connected to the network in operation 137 after being successfully allocated an IP address from the home AP 140, the home device 150 may automatically transmit an advertisement message including information that the home device 150 is connected to the network, to the controller device 160 in operation 139.

Through this procedure, the procedure for connecting the new home device 150 to the home network may be completed.

If the controller device 160 is not in the soft AP mode, but in a Wi-Fi P2P mode, the controller device 160 may collect Wi-Fi P2P connection information instead of collecting AP access information in operation 115, and after operation 121 in FIG. 1B, the AP 140 and the home device 150 may undergo AP connection. The Wi-Fi P2P mode as used herein means a mode for allowing the controller device (e.g., a controlling device) and the home device (e.g., a controlled device) to directly connect to each other.

In the case of the Wi-Fi P2P mode, the operations of FIGS. 1A and 1B may be applied to match with the Wi-Fi P2P mode.

Figure 4:
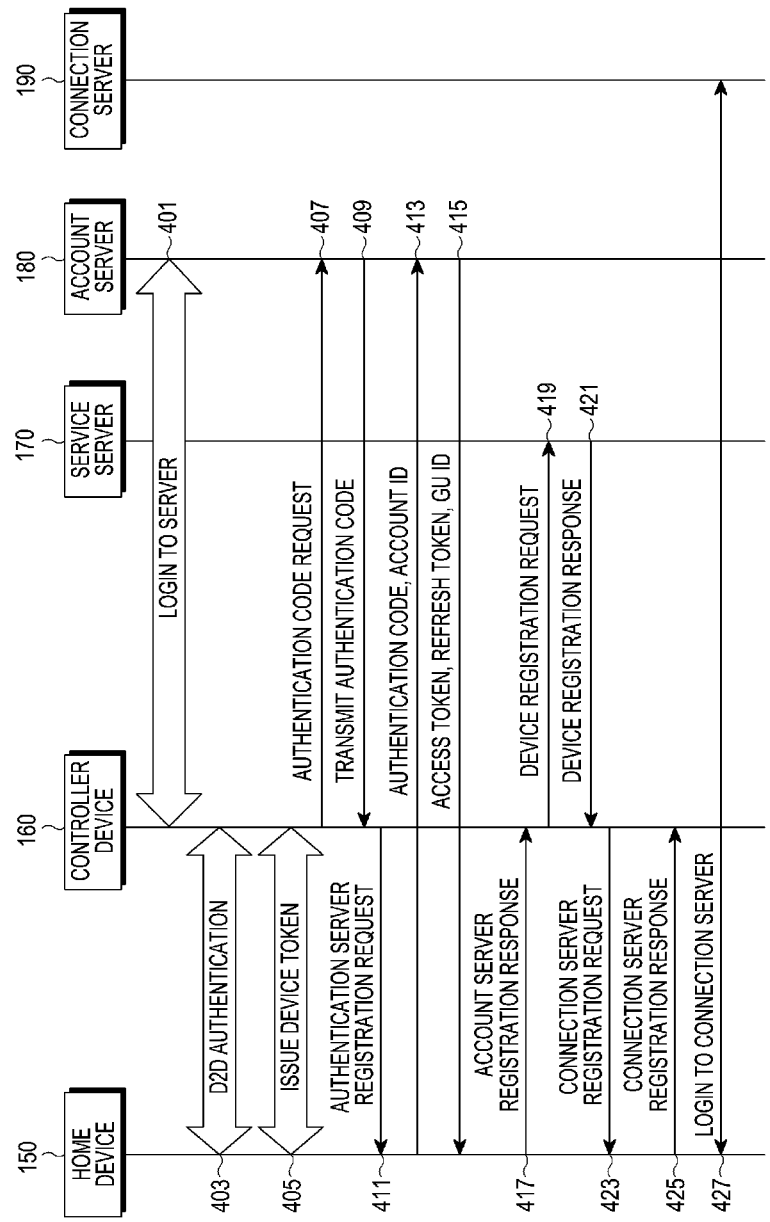
FIG. 4 illustrates a scenario of a procedure for registering a home device in a server after connecting the home device to a home network according to an embodiment of the present disclosure.

FIG. 4 illustrates a procedure for registering a home device in a server after connecting the home device to a home network according to an embodiment of the present disclosure.

In operation 401, the controller device 160 may log in to the account server 180. Thereafter, in operation 403, the controller device 160 may perform a Device to Device (D2D) authentication procedure with the home device 150 to exchange information with each other. Since the discovery of a home device, the information collection, and the D2D authentication procedure are different from the contents to be described in an embodiment of the present disclosure, a detailed description thereof will be omitted herein. On the assumption that the smart home App is already longed in to the account server, the controller device 160 may perform a procedure for generating a secure connection between devices, with the home device. For the secure connection, a technique for encrypting data using TLS may be used, and if TLS is used, a certificate may be used.

Thereafter, in operation 405, the home device 150 may issue a device token to the controller device 160, and the device token is used by a home device to authenticate a controller device. A device token to be described below may be a one-time token. In operation 407, the controller device 160 may transmit, to the account server 180, an authentication code request message including a device token to request an authentication code to be used by the home device 150. Then, in operation 409, the account server 180 may transmit an authentication code response message including an authentication code and a user account identifier to the controller device 160. In operation 411, the controller device 160 may transmit an authentication server registration request message to the home device 150, to request to register the authentication server. As the user account identifier, the user's e-mail address, phone number and the like may be used.

In response, in operation 413, the home device 150 may transmit an authentication code and a user account identifier to the account server 180. The account server 180 may check the user account identifier and the authentication code to verify whether the authentication code is an authentication code that the account server has normally issued to the user. If the verification is successful, the account server 180 may transmit an access token, a refresh token, a gu ID and the like to the home device 150 in operation 415.

Since the access token received from the account server 180 has its effective period, the access token may be no longer effective if an agreed effective period expires. Therefore, the access token should be updated within the effective period, and the refresh token may be used to update the access token.

Since a procedure for updating the access token is not related to the subject matter of the present disclosure, a detailed description thereof will be omitted.

The gu ID is a user ID that the account server allocates separately. The gu ID may be used as an ID for identifying account information of the home device by the account server.

If the home device 150 successfully receives the access token in operation 415, the home device 150 may informs again the controller device 160 of the success, using an account server registration response message in operation 417.

In operation 419, the controller device 160 may transmit a device registration request message to register the device information received from the home device 150 in the service server 170. In operation 421, the controller server 160 may receive a device registration response message from the service server 170. The device registration request message may include device information of the home device 150, and a UUID which is a unique ID of the home device 150.

In operation 423, the controller device 160 may transmit peer ID, peerGroupID and countryCode received from the service server 170, to the home device 150 using a connection server registration request message. In response thereto, the controller device 160 may receive a connection server registration response message in operation 425.

It will be apparent to those of ordinary skill in the art that the device registration procedure in FIG. 4 may be applied even to a ZigBee/Z-Wave registration procedure.

Figures 5, 6:
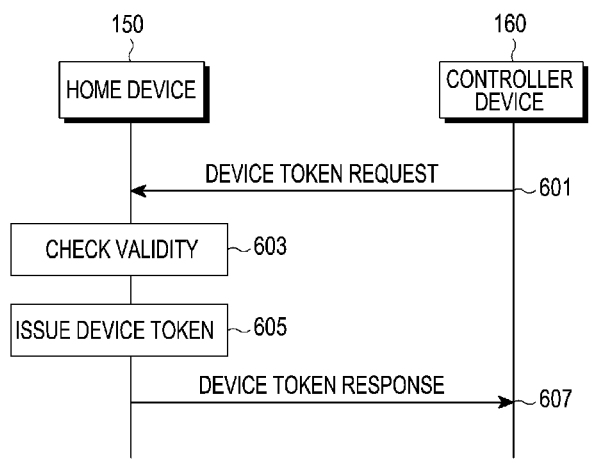
FIG. 5 illustrates an example of a connection server registration request message and a connection server registration response message according to an embodiment of the present disclosure.
FIG. 6 illustrates a scenario of a procedure for issuing a device token according to a first embodiment of the present disclosure.

FIG. 5 illustrates an example of a connection server registration request message and a connection server registration response message according to an embodiment of the present disclosure.

Referring to FIG. 5, the connection server registration request message may include peer ID, peerGroupID, countryCode and the like.

The peerGroupID indicates a group of devices that are registered in the service server using one user account. In other words, the controller device and the home device, which are registered using one user account, may have the same peerGroupID.

The countryCode means information about the country where the controller device's user is located.

The peerGroupID and the countryCode are the information that the controller device has received from the service server 170 when running the smart home App, and has stored in the controller device 160.

In operation 427, the home device 150 may logs in to the connection server 190. In other words, the home device 150 may access the connection server 190 using the peer ID, peerGroupID and countryCode received from the controller device 160 and the access token received from the account server 180.

FIG. 6 illustrates a scenario of a procedure for issuing a device token according to a first embodiment of the present disclosure.

In operation 601, the home device 150 may receive a device token request message for issuance of a device token from the controller device 160. At this time, the home device 150 may also receive UUID information of the controller device 160.

In operation 603, the home device 150 may perform validity check by comparing the UUID information obtained from the controller device 160 in the procedure of FIG. 1B with the UUID included in the device token request message received in operation 601.

If the UUIDs are the same, the home device 150 may determine that the request of the controller device that has requested the device token is a normal request. If the authentication is completed, the home device 150 doesn't need to store the UUID of the controller device 160.

If the validation is successful in the validity check procedure in operation 603, the home device 150 may issue a device token in operation 605.

In operation 607, the home device 150 may transmit a device token response message including the device token issued by the home device 150, to the controller device 160 in operation 607.

Figures 7, 8:
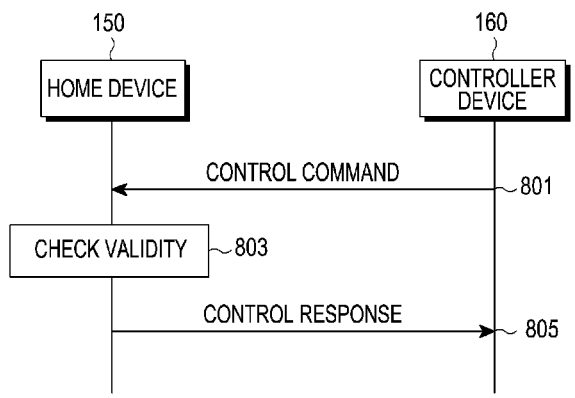
FIG. 7 illustrates an example of a device token request message and a device token response message according to an embodiment of the present disclosure.
FIG. 8 illustrates a scenario of a procedure for controlling a home device by a controller device using a device token received from the home device.

FIG. 7 illustrates an example of a device token request message and a device token response message according to an embodiment of the present disclosure.

Referring to FIG. 7, it can be noted that the device token request message includes a UUID and the device token response message includes the device token issued by the home device 150.

FIG. 8 illustrates a scenario of a procedure for controlling a home device by a controller device using a device token received from the home device.

In operation 801, the controller device 160 may transmit a control command (or a control command message) to the home device 150, for control of the home device 150. The control command message may include the device token received from the home device 150, together with a control command.

In operation 803, the home device 150 may check the device token included in the control command message, and determine whether the device token is a device token issued by the home device 150 (performing validity check).

If it is determined that the device token of the controller device 160 is valid, the home device 150 may execute the control command, and transmit the execution results to the controller device 160 in operation 805.

FIGS. 9 and 10 illustrate examples of a control command message and a control response message in FIG. 8 according to an embodiment of the present disclosure.

Referring to FIG. 9, the control command message may include, for example, information to stop the air conditioner. The control response message may indicate whether the device token is valid or not. If the authentication for the device token is failed in operation 803, the home device 150 may transmit the message in FIG. 10 as a response to the control command, without executing the control command.

If the smart home App in the controller device is deleted, or if the issued device token is damaged or lost due to the damage of the system file or the user's mistake, the user cannot control the home device. Therefore, a description will be made of a procedure in which the controller device is reissued a device token. Reissuance of a token may be done in the following two ways.

Figure 11:
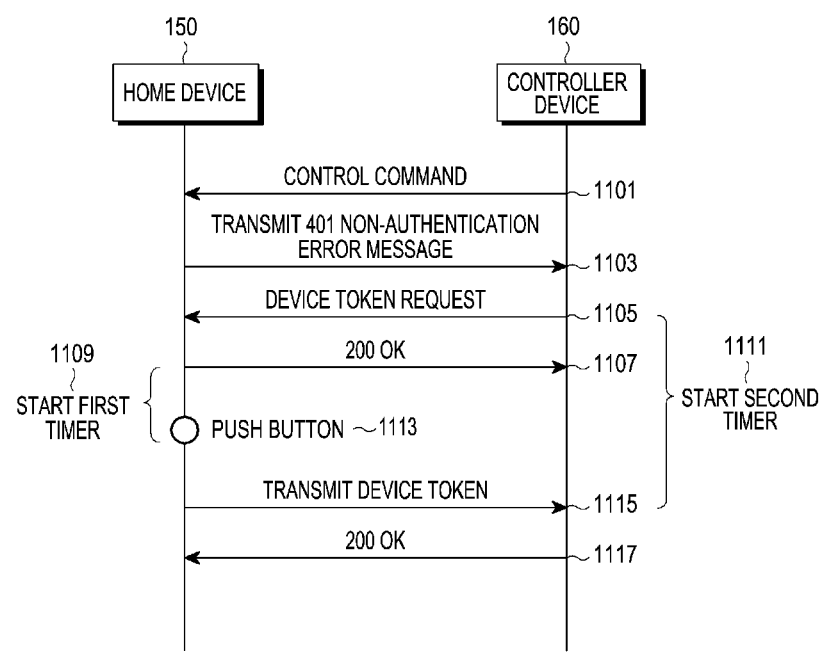
FIG. 11 illustrates a scenario of a method for managing the security according to a second embodiment of the present disclosure.

FIG. 11 illustrates a scenario of a method for managing the security according to a second embodiment of the present disclosure.

The first embodiment of the present disclosure is a way to perform the procedures in FIGS. 1A, 1B and 6 from the beginning. However, the second embodiment of the present disclosure may undesirably hinder the user experience, since it should perform a procedure for connecting again the home device that has already been connected to the home network, from the beginning. Therefore, a procedure for reissuing only the device token without the reconnection procedure will be described in FIG. 11.

If the controller device 160 sends a control command to the home device 150 using a device token in a damaged state, or without using the device token in operation 1101, the home device 150 may transmit a 401 error message (or a 401 non-authentication error message) for the failure in authentication of the device token, in reply to the control command in operation 1103.

Upon receiving the error message, the controller device 160 may transmit a device token request message for reissuance of a device token to the home device 150 in operation 1105. The device token request message is the same as the message in operation 601 in FIG. 6. Since the home device 150 may not have the UUID information unlike in the procedure of FIG. 6, the home device 150 may determine whether the controller device 160 is a device that may get the device token. Therefore, the home device 150 may first transmit only the response message (e.g., a 200 OK message) indicating that the home device 150 has normally received the device token request message in operation 1105. The response message may include no information. At the time of transmitting the response message, the home device 150 may start a first timer.

Upon receiving the response message including no device token, the controller device 160 may inform the user of the fact that there is a need for a separate procedure for reissuing a device token, using the smart home App. The user may push a specific button on the home device 150 or a button on a remote controller in accordance with a guide of the smart home App in operation 1107. Since the specific button or the remote controller's button is pushed within a predetermined time set in the first timer in operation 1113 after the home device 150 receives a token issuance request message, the home device 150 may issue a device token, recognizing that the device token issuance request is a normal request. The button may be replaced by short-range communication means such as near field communication (NFC) proximity and Bluetooth low energy (BLE) proximity.

In operation 1115, the home device 150 may transmit the issued device token to the controller device 160. If the controller device 160 receives the message (or the device token in operation 1115) for allocation of a device token within a predetermined time after the controller device 160 transmitted the token reissuance request message in operation 1105, the controller device 160 may store the device token and transmit a response message (e.g., a 200 OK message) indicating its normal reception of the message to the home device 150 in operation 1117. If the controller device 160 fails to receive a device token within a predetermined time after transmitting the device token issuance request message, the controller device 160 may regard it as a request failure, and may not store the device token that the controller device 160 has received after a second timer. However, the timer value (or a second timer value) set by the controller device 160 should be larger than the timer value (or a first timer value) set by the home device.

Figure 12:
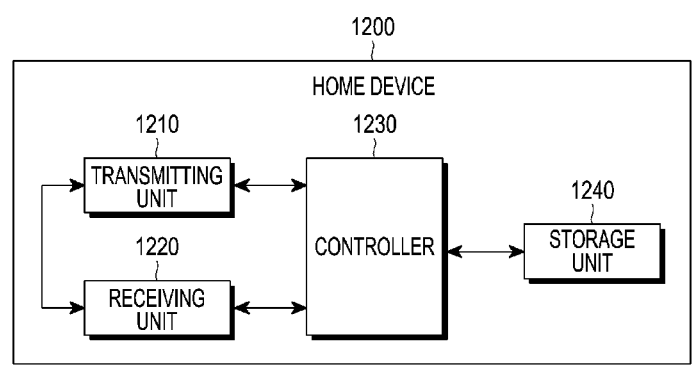
FIG. 12 illustrates an internal structure of a home device according to an embodiment of the present disclosure.

FIG. 12 illustrates an internal structure of a home device according to an embodiment of the present disclosure.

Referring to FIG. 12, a home device 1200 may include a transmitting unit 1210, a receiving unit 1220, a controller 1230 and a storage unit 1240.

If a device is added by a controller device, the receiving unit 1220 of the home device 1000 may receive a variety of information for accessing the controller device based on AP access information.

The receiving unit 1220 of the home device 1000 may also receive controller device information from the controller device.

The transmitting unit 1210 of the home device 1000 may transmit a variety of information for accessing the controller device, to the controller device.

The controller 1230 of the home device 1000 may issue a device token at the request of the controller device. Herein, the device token may be used by the home device 1000 to authenticate the controller device. In addition, the controller 1230 of the home device may perform a series of processes for security management according to an embodiment of the present disclosure. The controller 1230 of the home device 1000 may perform a series of below-described processes, which are performed in the home device.

The controller 1230 of the home device may control operations of the transmitting unit 1210 and the receiving unit 1220, and the information transmitted and received through the transmitting unit 1210 and the receiving unit 1220 may be stored in the storage unit 1240.

Figure 13:
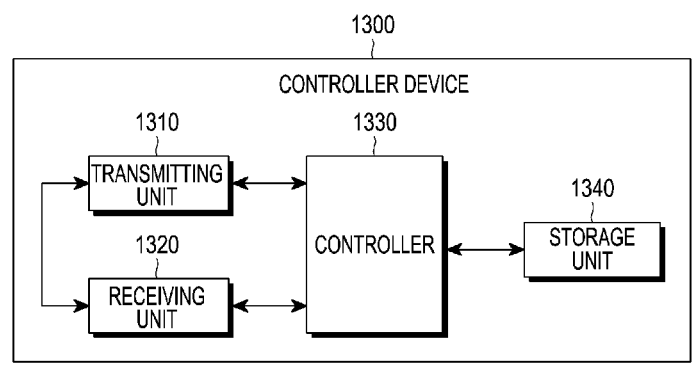
FIG. 13 illustrates an internal structure of a controller device for registering a home device in a server in a home network system.

FIG. 13 illustrates an internal structure of a controller device for registering a home device in a server in a home network system.

Referring to FIG. 13, an illustrate controller device 1300 may include a transmitting unit 1310, a receiving unit 1320, a controller 1330 and a storage unit 1340.

The transmitting unit 1310 of the controller device 1300 may transmit a variety of information for accessing the home device.

The receiving unit 1320 of the controller device 1300 may receive a variety of information for accessing the home device.

The controller 1330 of the controller device 1300 may control operations of the transmitting unit 1310 and the receiving unit 1320, and the information transmitted and received through the transmitting unit 1310 and the receiving unit 1320 may be stored in the storage unit 1340.

The controller 1330 of the controller device 1300 may issue its own token, and may request the home device 1000 to issue a token. The controller 1330 of the controller device 1300 may perform a series of processes for security management according to an embodiment of the present disclosure. The controller 1330 of the controller device 1300 may perform a series of below-described processes, which are performed in the controller device.

Figure 14A:
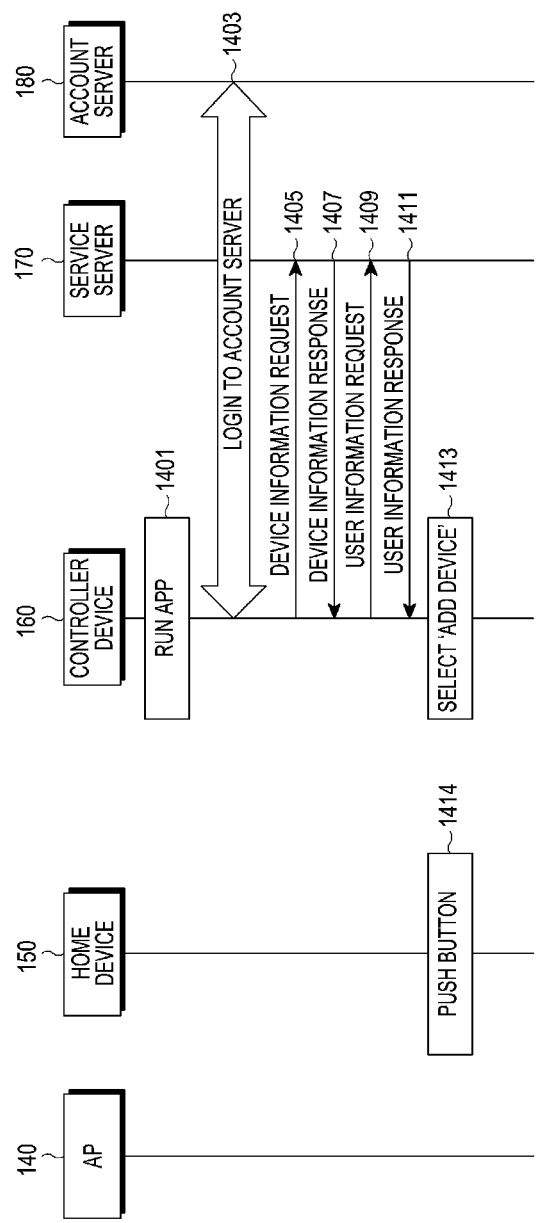
FIGS. 14A and 14B illustrate an example of a procedure for connecting a home device to a home network in a home network system according to another embodiment of the present disclosure.
Figure 14B:
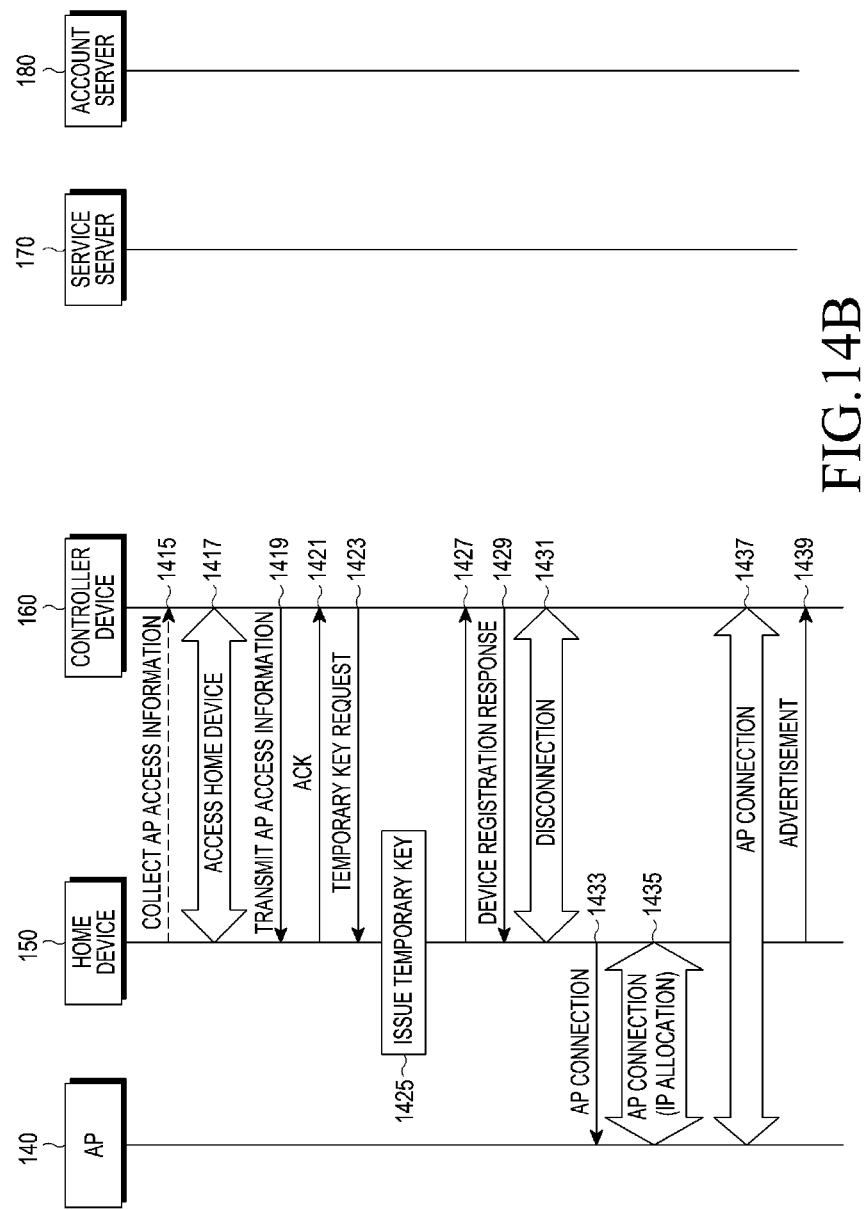

FIGS. 14A and 14B illustrate an example of a procedure for connecting a home device to a home network in a home network system according to another embodiment of the present disclosure.

Since operations 1401 to 1421 in FIGS. 14A and 14B are the same as operations 101 to 121 in FIGS. 1A and 1B, a detailed description thereof will be omitted.

In operation 1423, the controller device 160 may receive an ACK message from the home device 150. The controller device 160 may send an issuance request message to the home device 150 to request a temporary key for issuance of a device token. In operation 1425, the home device 150 may issue a temporary key in response to the issuance request message, and compare the temporary key issued in response to the issuance request message with the previously stored temporary key. If the temporary key issued in response to the issuance request message matches with the previously stored temporary key, the home device 150 may issue a device token using the temporary key. Thereafter, the home device 150 may discard the temporary key.

Since operations 1427 to 1439 in FIG. 14B are the same as operations 127 to 139 in FIG. 1B, a detailed description thereof will be omitted.

Figure 15:
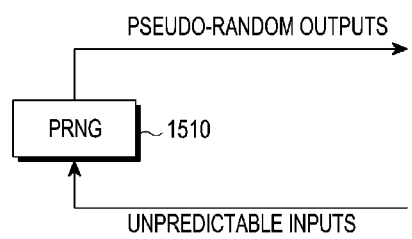
FIG. 15 is a block diagram describing a method for issuing a device token according to another embodiment of the present disclosure.

FIG. 15 is a block diagram describing a method for issuing a device token according to another embodiment of the present disclosure.

Upon receiving an unpredictable input value, a pseudo-random number generator (PRNG) 1510 may output a pseudorandom number. However, the reliability of the pseudorandom number may drop because of the low randomness of the input value. In other words, the predictability may be relatively high.

Accordingly, in another embodiment of the present disclosure, the pseudorandom number may be generated based on pattern information. The pattern information may include a combination of information about, for example, the password, the frequency of daily use, and the time for a doorlock. A seed value may be generated based on the pattern information, meta-information and the like. The meta-information may include unique information such as a device ID and a MAC address.

Figure 16:
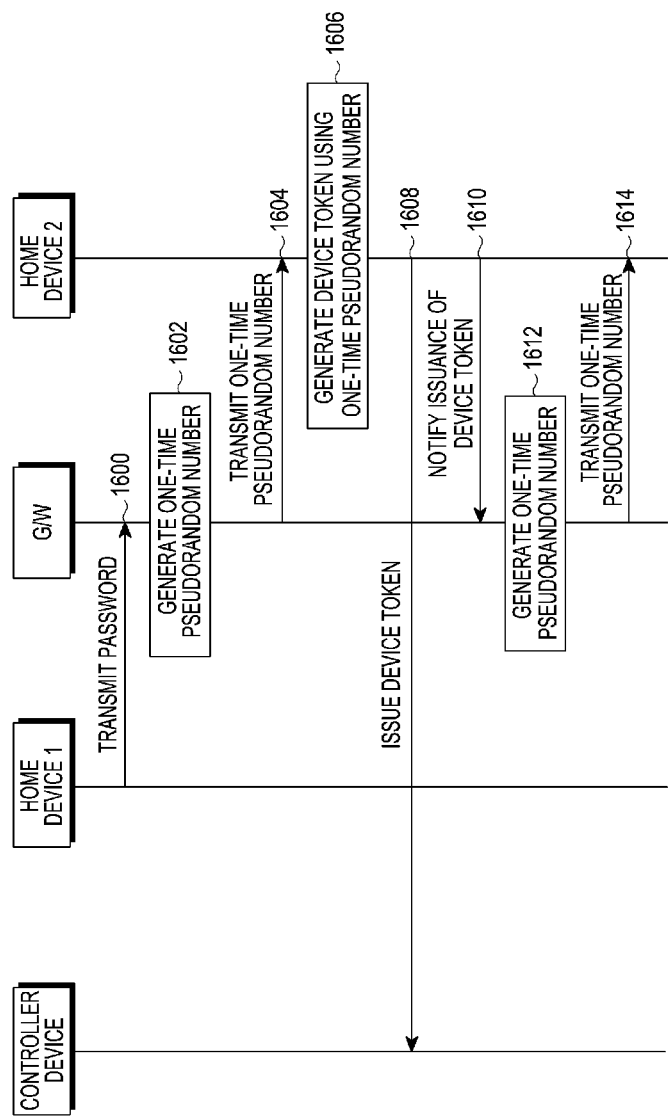
FIG. 16 is a flowchart illustrating a method for managing a key using a gateway according to an embodiment of the present disclosure.

FIG. 16 is a flowchart illustrating a method for managing a key using a gateway according to an embodiment of the present disclosure.

In operation 1600, a home device 1 may transmit, for example, a password of a doorlock to a gateway. In operation 1602, the gateway may generate a one-time pseudorandom number using the password of the doorlock. The gateway may serve to collect pattern information of a plurality of home devices. In other words, in operation 1604, the gateway may transmit the generated one-time pseudorandom number to a home device 2. In operation 1606, the home device 2 may generate a device token using the one-tine pseudorandom number. After generating the device token, the home device 2 may discard the one-time pseudorandom number.

As described above, by generating a device token using the one-time pseudorandom number, it is possible to further enhance the security (dual encryption, etc.).

In operation 1608, the home device 2 may issue the generated device token to a controller device. In operation 1610, the home device 2 may transmit the generated device token to the gateway. Operations 1608 and 1610 may be changed to each other in terms of the order. The gateway may generate a one-time pseudorandom number in operation 1612, and transmit the generated one-time pseudorandom number to the home device 2 in operation 1614.

Figure 17:
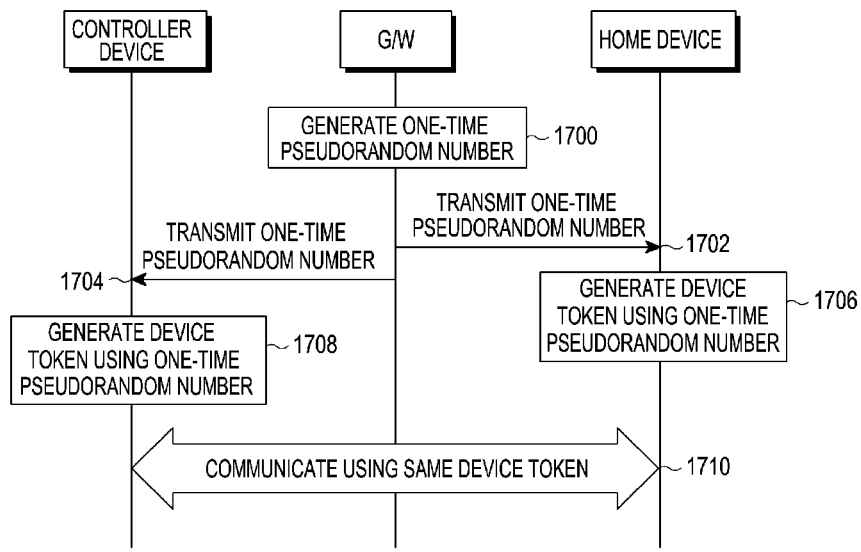
FIG. 17 is a flowchart illustrating a method for managing a key using a gateway according to another embodiment of the present disclosure.

FIG. 17 is a flowchart illustrating a method for managing a key using a gateway according to another embodiment of the present disclosure.

Upon collecting pattern information of a home device, a gateway may generate a one-time pseudorandom number using the pattern information in operation 1700. In operation 1702, the gateway may transmit the one-time pseudorandom number to the home device. In addition, in operation 1704, the gateway may transmit the one-time pseudorandom number to a controller device. Operations 1702 and 1704 may be changed to each other in terms of the order. The one-time pseudorandom number transmitted in operation 1702 and the one-time pseudorandom number transmitted in operation 1704 may be the same.

In operation 1706, the home device may generate a device token using the one-time pseudorandom number. After generating the device token, the home device may discard the one-time pseudorandom number.

Similarly, in operation 1708, the controller device may generate a device token using the one-time pseudorandom number. After generating the device token, the home device may discard the one-time pseudorandom number.

Operations 1708 and 1706 may be changed to each other in terms of the order.

In operation 1710, the device and the home device may communicate with each other using the same device token.

Figure 18:
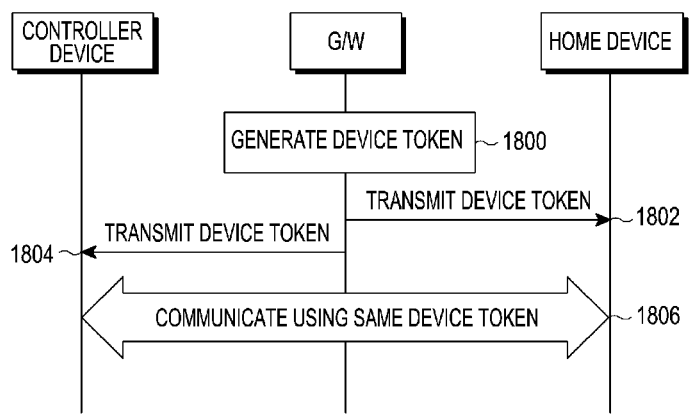
FIG. 18 is a flowchart illustrating a method for managing a key using a gateway according to further another embodiment of the present disclosure.

FIG. 18 is a flowchart illustrating a method for managing a key using a gateway according to further another embodiment of the present disclosure.

In operation 1800, a gateway may directly generate a device token without using a one-time pseudorandom number.

In operation 1802, the gateway may transmit the device token to a home device. In addition, in operation 1804, the gateway may transmit the device token to a controller device. Operations 1802 and 1804 may be changed to each other in terms of the order. The device token transmitted in operation 1802 and the device token transmitted in operation 1804 may be the same.

In operation 1806, the controller device and the home device may communicate with each other using the same device token.

Figure 19A:
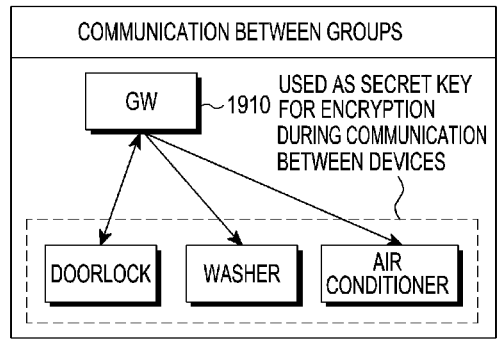
FIGS. 19A to 19C illustrate examples of a method for managing a key using a gateway according to an embodiment of the present disclosure.
Figure 19B:
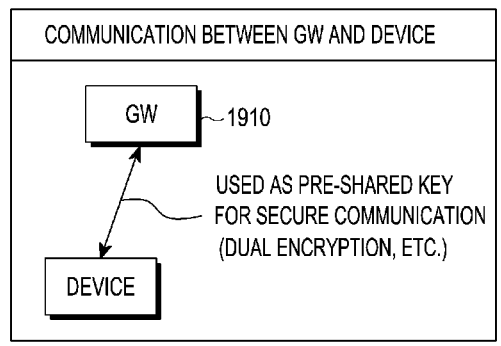
Figure 19C:
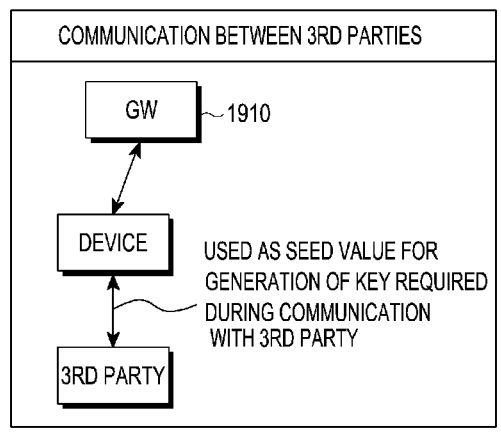

FIGS. 19A to 19C illustrate examples of a method for managing a key using a gateway according to an embodiment of the present disclosure.

FIG. 19A shows that one group is generated with, for example, a doorlock, a washer and an air conditioner, and a gateway can issue a device token using a secret key (e.g., a group key) for encryption during communication between devices in a group.

FIG. 19B shows that a gateway can issue a device token using a pre-shared key for secure communication (dual encryption, etc.).

FIG. 19C shows that a gateway can issue a device token using a seed value for generating a key required during communication with the third party.

To solve the problems that may occur due to the leakage of user account information, the present disclosure may manage the security using the device token that is used independently of that of the server, that is generated by a home device, and that can be used for device authentication when a controller device (e.g., a smart phone) controls the home device.

With the use of the device token, the present disclosure may solve the problems that the status information of home appliances is exposed by another person or the home appliances are controlled by another person, even though the user account information is leaked.

It can be appreciated that the security management method and apparatus in a home network system according to an embodiment of the present disclosure may be implemented by hardware, software or a combination thereof. The software may be stored in a volatile or non-volatile storage device (e.g., an erasable/re-writable ROM, etc.), a memory (e.g., a RAM, a memory chip, a memory device, a memory IC, etc.), or an optically/magnetically recordable machine (e.g., computer)-readable storage medium (e.g., CD, DVD, magnetic disk, magnetic tape, etc.). The security management method in a home network system according to an embodiment of the present disclosure may be implemented by a computer or a mobile terminal that includes a controller and a memory. It will be apparent to those of ordinary skill in the art that the memory is an example of the machine-readable storage medium suitable to store a program or programs including instructions for implementing embodiments of the present disclosure.

Therefore, the present disclosure may include a program including a code for implementing the apparatus and method as defined by the appended claims, and a machine (e.g., computer)-readable storage medium storing the program. The program may be electronically carried by any media such as communication signals that are transmitted through wired/wireless connections.

The security management apparatus in a home network system according to an embodiment of the present disclosure may receive and store the program from a program server to which the security management apparatus is connected by wires or wirelessly. The program server may include a memory for storing a program including instructions for performing the security management method in the pre-set home network system and storing information necessary for the security management method in the home network system, a communication unit for performing wired/wireless communication with the graphic processing unit, and a controller for transmitting a program to the transceiver at the request of the graphic processing unit or automatically.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for managing a home device by a terminal in a security system, the method comprising:
    transmitting, to the home device, a request message including an identifier of the terminal for requesting a device token;
    receiving the device token issued from the home device if the identifier of the terminal is equal to an identifier stored in the home device;
    transmitting, to the home device, a control command including the device token; and
    receiving a message indicating a result of executing the control command from the home device if the device token is a device token issued by the home device,
    wherein the device token is generated in the home device based on a random number, and
    wherein the random number is generated in the home gateway based on a pattern information of the home device or another home device and is transmitted to the home device from the home gateway.

2. The method of claim 1, wherein the identifier of the terminal includes a unique user identifier (UUID).

3. The method of claim 1, wherein the home device operates as an access point, upon detecting a button input by a user.

4. The method of claim 1, wherein the home device is directly connected to the terminal, upon detecting a button input by a user.

5. The method of claim 1, wherein the identifier of the terminal is used by the home device to determine validity of the terminal.

6. The method of claim 1, wherein the device token is issued based on a temporary key.

7. A terminal for managing a home device in a security system, the terminal comprising:
    a transmitter configured to transmit a request message including an identifier of the terminal for requesting a device token to the home device; and
    a receiver configured to receive the device token issued from the home device if the identifier of the terminal is equal to an identifier stored in the home device,
    wherein the transmitter is further configured to transmit, to the home device, a control command including the device token,
    wherein the receiver is further configured to receive a message indicating a result of executing the control command from the home device if the device token is a device token issued by the home device,
    wherein the device token is generated in the home device based on a random number, and
    wherein the random number is generated in the home gateway based on a pattern information of the home device or another home device and is transmitted to the home device from the home gateway.

8. The terminal of claim 7, wherein the identifier of the terminal includes a unique user identifier (UUID).

9. The terminal of claim 7, wherein the home device is configured to operate as an access point, upon detecting a button input by a user.

10. The terminal of claim 7, wherein the home device is configured to be directly connected to the terminal, upon detecting a button input by a user.

11. The terminal of claim 7, wherein the identifier of the terminal is used by the home device to determine validity of the terminal.

12. The terminal of claim 7, wherein the device token is issued based on a temporary key.

13. A method for managing a home device in a security system, the method comprising:
    receiving, from a terminal, a request message including an identifier of the terminal for requesting a device token;
    issuing the device token if the identifier of the terminal is equal to an identifier stored in the home device;
    transmitting, to the terminal, the device token;
    receiving, from the terminal, a control command including the device token; and
    transmitting, a message indicating a result of executing the control command to the terminal if the device token is a device token issued by the home device,
    wherein the device token is generated in the home device based on a random number, and
    wherein the random number is generated in the home gateway based on a pattern information of the home device or another home device and is transmitted to the home device from the home gateway.

14. The method of claim 13, wherein the identifier of the terminal includes a unique user identifier (UUID).

15. The method of claim 13, wherein the home device operates as an access point, upon detecting a button input by a user.

16. The method of claim 13, wherein the home device is directly connected to the terminal, upon detecting a button input by a user.

17. The method of claim 13, wherein the identifier of the terminal is used by the home device to determine validity of the terminal.

18. The method of claim 13, wherein the device token is issued based on a temporary key.

19. An apparatus for managing a home device in a security system, the apparatus comprising:
- a receiver configured to receive, from a terminal, a request message including an identifier of the terminal for requesting a device token;
- at least one processor configured to issue the device token if the identifier of the terminal is equal to an identifier stored in the apparatus; and
- a transmitter configured to transmit, to the terminal, the device token,
- wherein the receiver is further configured to receive, from the terminal, a control command including the device token,
- wherein the transmitter is further configured to transmit, to the terminal, a message indicating a result of executing the control command if the device token is a device token issued by the apparatus,
- wherein the device token is generated in the home device based on a random number, and
- wherein the random number is generated in the home gateway based on a pattern information of the home device or another home device and is transmitted to the home device from the home gateway.

20. The apparatus of claim 19, wherein the identifier of the terminal includes a unique user identifier (UUID).

21. The apparatus of claim 19, wherein the apparatus is configured to operate as an access point, upon detecting a button input by a user.

22. The apparatus of claim 19, wherein the apparatus is configured to be directly connected to the terminal, upon detecting a button input by a user.

23. The apparatus of claim 19, wherein the identifier of the terminal is used by the apparatus to determine validity of the terminal.

24. The apparatus of claim 19, wherein the device token is issued based on a temporary key.

* * * * *